United States Patent [19]

Mehta

[11] Patent Number: 5,138,641
[45] Date of Patent: Aug. 11, 1992

[54] BIT RESIDUE CORRECTION IN A DLC RECEIVER

[75] Inventor: Mayur M. Mehta, Austin, Tex.

[73] Assignee: Advanced Micro Devices, Inc., Sunnyvale, Calif.

[21] Appl. No.: 343,810

[22] Filed: Apr. 27, 1989

[51] Int. Cl.[5] .............. G11C 19/00; G06F 3/00; G06F 11/00
[52] U.S. Cl. .................. 377/54; 377/69; 377/73; 377/81; 377/44; 364/715.08; 370/99
[58] Field of Search ............. 377/50, 54–56, 377/44, 33, 37, 64, 67–69, 75, 77; 364/715.08, 736.5, 739; 341/95; 370/32, 94.1, 99, 82, 83

[56] References Cited

U.S. PATENT DOCUMENTS

| H856 | 2/1989 | Kun | 370/94 |
|---|---|---|---|
| 3,887,769 | 6/1975 | Cichetti, Jr. et al. | 377/54 |
| 4,040,049 | 8/1977 | Messerschmitt | 341/95 |
| 4,468,789 | 8/1984 | Gromen | 377/64 |
| 4,494,194 | 1/1985 | Harris et al. | 395/275 |
| 4,554,529 | 11/1985 | Moriyama et al. | 341/95 |
| 4,601,056 | 7/1986 | Habitzreiter et al. | 382/50 |
| 4,680,733 | 7/1987 | Duforestel et al. | 377/64 |
| 4,692,859 | 9/1987 | Ott | 377/54 |
| 4,885,584 | 12/1989 | Dalrymple | 341/95 |
| 4,949,333 | 8/1990 | Gulick et al. | 370/24 |

FOREIGN PATENT DOCUMENTS 0076633 5/1982 Japan ...................... 377/54

Primary Examiner—Stanley D. Miller
Assistant Examiner—Tai V. Duong
Attorney, Agent, or Firm—Foley & Lardner

[57] ABSTRACT

A data link controller receiver is disclosed that includes a series of shift registers and a bit counter that counts the number of received bits. When an end of frame character is received, the value in the bit counter which represents the bit residue is supplied to a bit adjustment counter. The bit adjustment counter is employed to control the operation of the shift register containing the bit residue during a byte adjust operation, in a manner which enables the shift register containing the bit residue to be clocked until the value in the bit adjustment counter is indicative of the number of bits in a defined byte. Accordingly, the bit residue is serially shifted until the least significant bit of the shift register is filled. In addition, a mechanism is provided for loading zeros into the shift register during the byte adjust operation.

8 Claims, 3 Drawing Sheets

BIT RESIDUE CORRECTION IN A DLC RECEIVER

BACKGROUND OF THE INVENTION

The present invention relates generally to the field of digital data communications. In particular, the present invention relates to data link controllers (DLC) capable of receiving data in a serial format and performing a serial to parallel conversion on the received data.

Some data communication protocols, for example X.25, contain characters ranging from five to eight bits in length. These characters are typically received by devices which operate on bytes of data. As the characters contain fewer bits than required for a full byte, additional bits must be added to the character bits to form a full byte corresponding to each character. The data communication protocols permit the characters to be stripped of these superflous bits and concatenated into an information field (I field) of a packed bit stream for transmission, in order to utilize the full bandwidth of a given communications network. Generally, the DLC receiver will receive and store the I field in eight bit byte segments, which can result in the last segment being incomplete if the length of the received characters is less than eight bits or one byte. In other words, the I field is segmented into eight bit bytes and the bits left over after segmentation consitute bit residue. For example, if the character length is five bits and five characters are received, the DLC will break the twenty-five total received bits into three eight bit byte segments with a single bit remaining in the last segment.

The DLC receives each character of the I field in a reciver buffer having a plurality of shift registers that receive data serially and transfer the data out in parallel to a memory device such as a first-in first-out (FIFO) buffer. If the communication protocol transmits defines the first bit of a character to be transmitted as the least significant bit (LSB) of a character, then the shift registers serially receive data into what can be defined as the shift registers most significant bit (MSB) position first and the data is serially shifted within the registers every time a clock signal is received until the shift registers are filled with a full byte of data. A parallel transfer operation is then performed by the last shift register to transfer the data byte contained in the last shift register into the FIFO. The data bytes stored in the FIFO may therefore contain data bits from more than one character if the character length is less than the number of bits in a byte.

The above-described operation of the shift registers, however, creates a problem with respect to the bit residue as a full byte of data is not serially loaded into the shift register prior to the parallel transfer operation. For example, if the bit residue constitutes five bits, the three least significant bits of the last shift register will not be filled. Thus, some mechanism must be provided to fully shift the five residue bits in the last shift register until the least significant bit (LSB) of the shift register is filled, while at the same time filling the three most significant bits of the register.

SUMMARY OF THE INVENTION

The present invention provides a method and apparatus for handling bit residue in a data link controller receiver. In particular, a data link controller receiver is provided that includes a series of shift registers and a bit counter that counts the number of received bits. When an end of frame character is received, the value in the bit counter which represents the bit residue is supplied to a bit adjustment counter. The bit adjustment counter is employed to control the operation of the shift register containing the bit residue during a byte adjust operation, in a manner which enables the shift register containing the bit residue to be clocked until the value in the bit adjustment counter is indicative of the number of bits in a defined byte. Accordingly, the bit residue is serially shifted until the most significant bit of the shift register is filled. In addition, a mechanism is provided for loading zeros into the shift register during the byte adjust operation.

BRIEF DESCRIPTION OF THE DRAWINGS

With the above as background, reference should now be made to the detailed description of the preferred embodiment and the drawings, in which.

DETAILED DESCRIPTION OF THE PREFERRED EMBODIMENT

Figure 1:
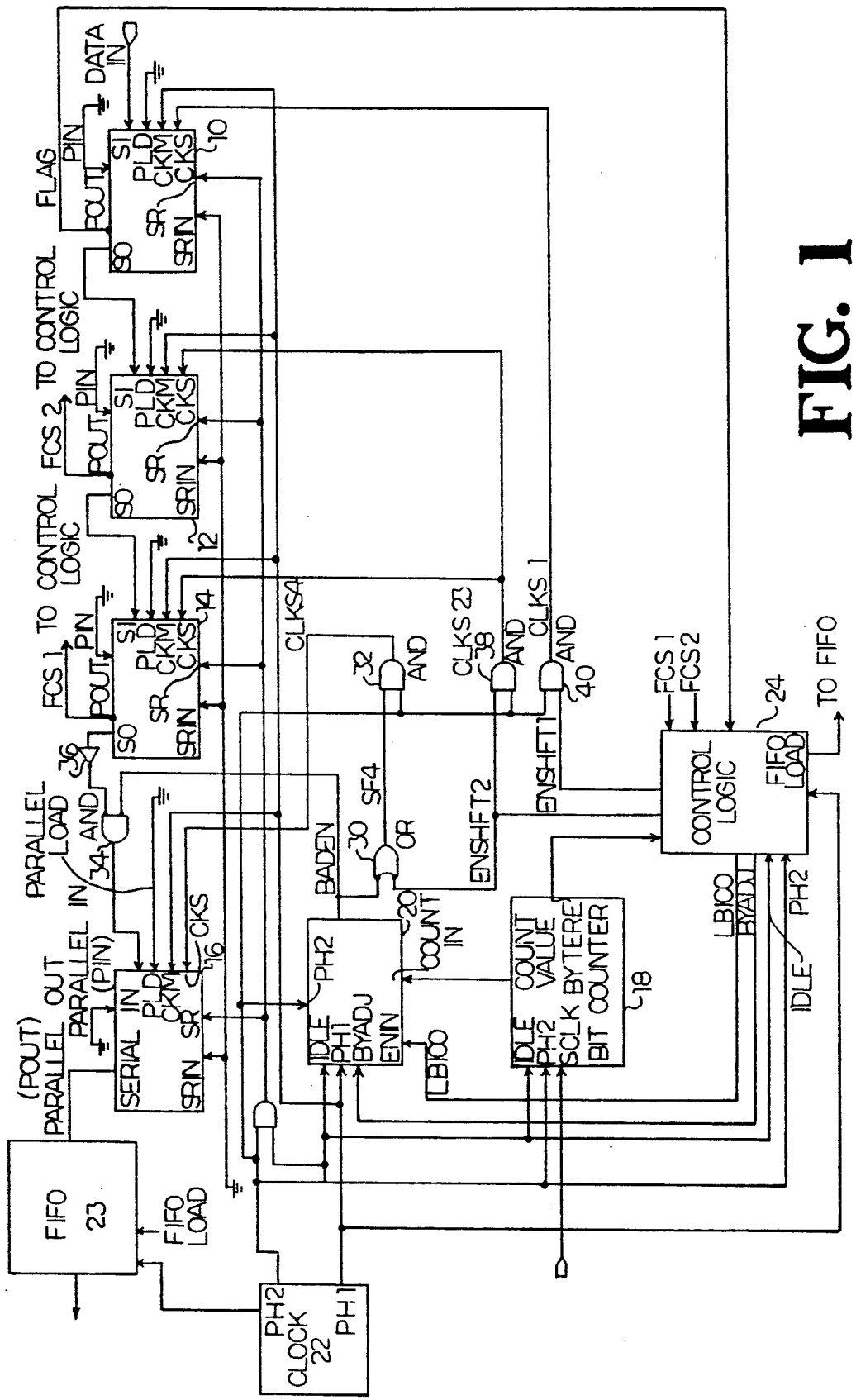
FIG. 1 illustrates a DLC receiver in accordance with the present invention.

Referring now to FIG. 1, a DLC receiver is shown having a plurality of shift registers 10–16 arranged in series to form a receive buffer, a bit counter 18, a byte adjust counter 20, a clock 22, a FIFO 23 and control logic 24. The control logic 24 can implemented as discrete components or through the use of a processing unit of a microprocessor. The flow of data is from right to left in FIG. 1, and serial data is shifted from the MSB to the LSB of the shift registers 10–16.

In the embodiment illustrated, the shift register 10 is designated as the flag register, shift registers 12 and 14 are respectively designated as frame check sequence two (FCSR2) and frame check sequence one (FCSR1) registers, and shift register 16 is designated as the last byte register, i.e., the register containing the last byte of data when an end of frame character is received in shift register 10. The parallel output ports of shift registers 10–14 are coupled to the control logic 24, while the parallel output port of shift register 16 is coupled to the input of the FIFO 23.

Bit counter 18 is a four bit counter that internally resets and drives a a byte received line (BYTERE) to a high logic level when the count value of the bit counter 18 reaches the number of bits in a byte (eight in this case). The BYTERE signal is used to indicate to the control logic 24 that a full byte has been received. The bit counter 18 is incremented upon receipt of a serial clock signal (SCLK) which is supplied with the incoming data stream.

Figure 2:
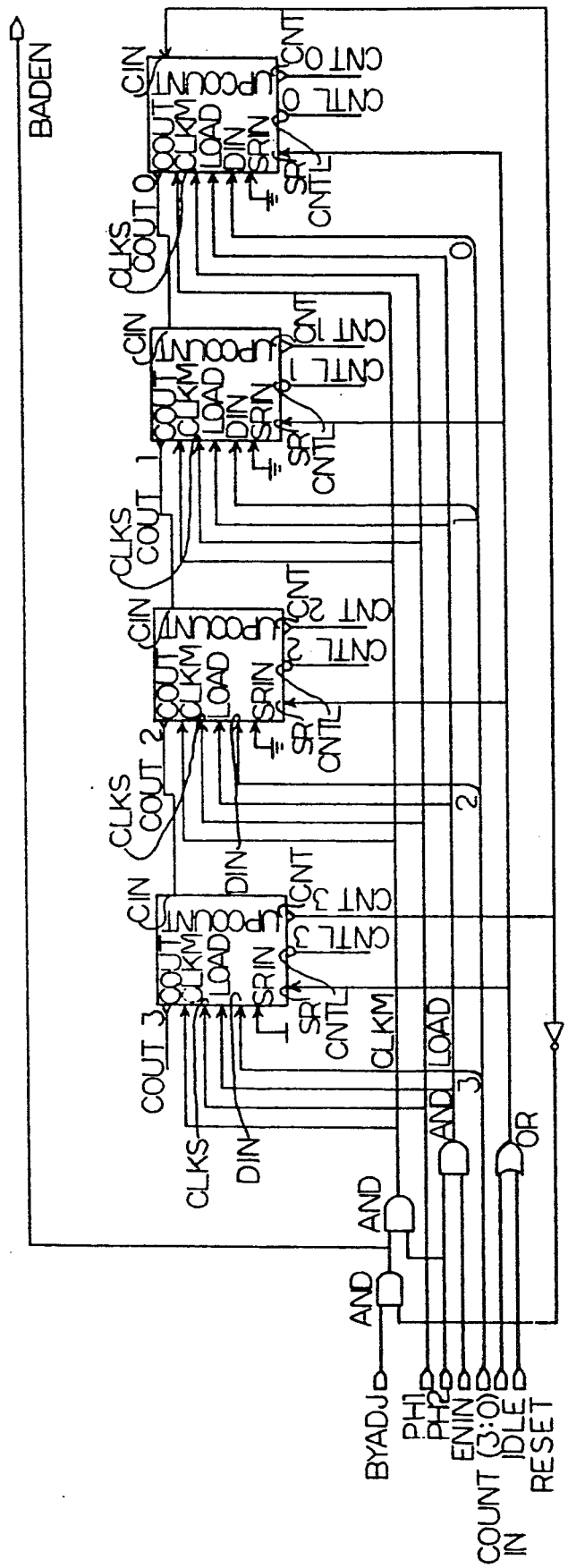
FIG. 2 illustrates a byte adjust counter employed in the DLC receiver illustrated in FIG. 1.
Figure 3:
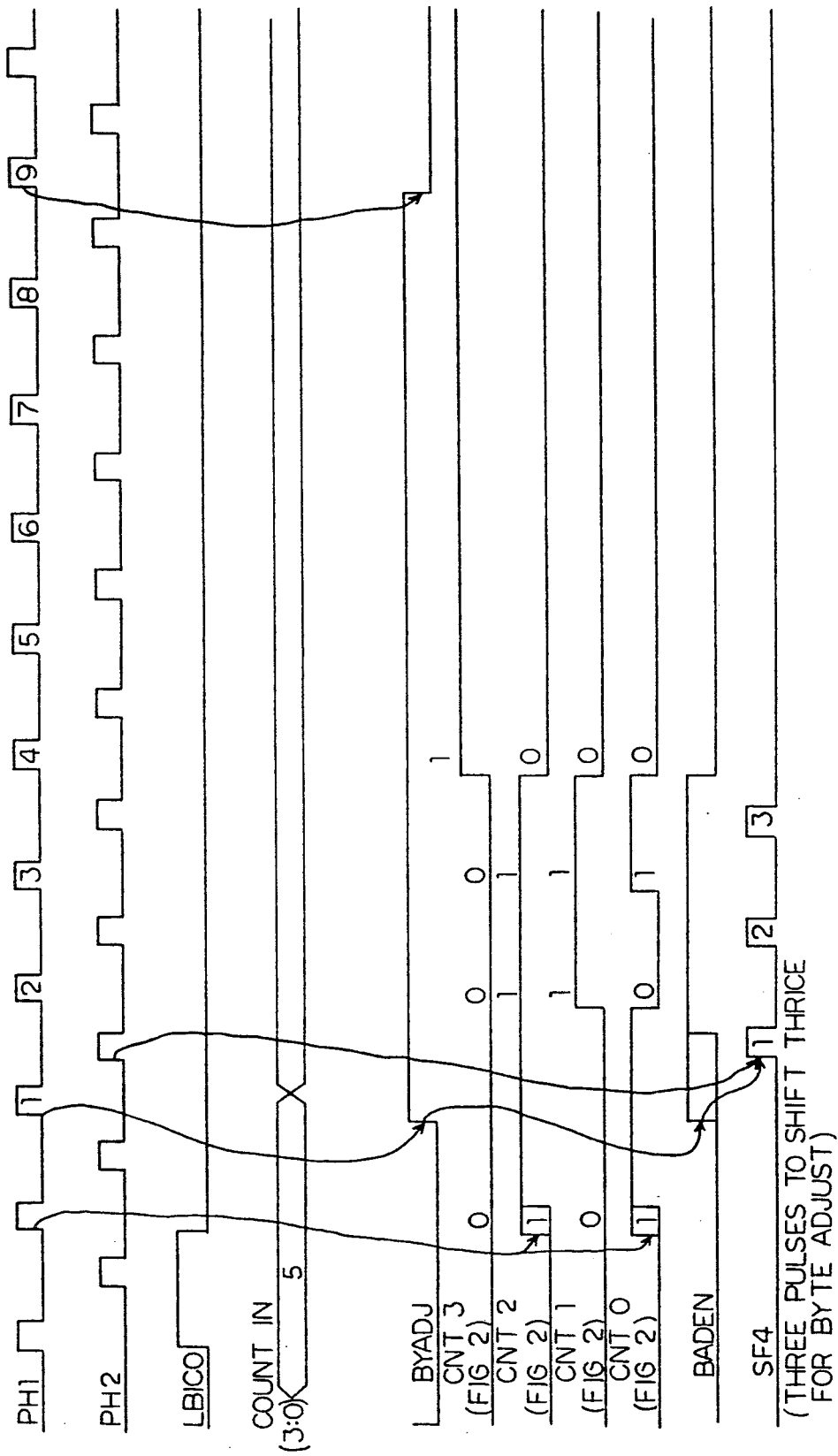
FIG. 3 is a diagram illustrating the various control signals employed in the operation of the DLC illustrated in FIG. 1.

The output lines of the bit counter 18 are coupled to the input port of the byte adjust counter 20 and the count value in the bit counter 18 is loaded into the byte adjust counter 20 when the load byte counter (LBICO) signal is supplied to the enable input pin (ENIN) of the byte adjust counter 20 by the control logic 24. A more detailed schematic of the byte adjust counter 20 is provided in FIG. 2. The byte adjust counter 20 generates a byte adjustment enable signal (BADEN) from the output of AND gate 40. The inputs to the AND gate 40 are a byte counter enable signal (BYADJ) received from the control logic 24, and the inverted MSB (CNT3) of the byte adjust counter 20. The BADEN signal will therefore remain at a high logic level as long as a byte counter enable signal (BYADJ) is supplied to the byte adjust counter 20 and the MSB of the byte adjust counter 20 is at a logic low level. The BADEN signal is driven to a low logic level as soon as the MSB of the byte adjust counter 20 switches to a high logic level "1", i.e., when the count value of the byte adjust counter 20 is equal to the number of bits in a byte.

The BADEN signal is used to control the operation of the shift register 16 and to back fill the contents of the shift register 16 with "zeros" when a byte adjustment operation is performed. Specifically, the BADEN signal is supplied as one input to an OR gate 30 and the other input to the OR gate 30 is a shift enable signal (ENSHFT2) supplied by the control logic 24. The output of the OR gate is supplied to the input of AND gate 32 along with a PH2 clock signal generated by the clock 22 in order to generate a clock signal CLK4 which is used to clock the shift register 16. The BADEN signal is also suppled to one input of a NAND gate 34, and the second input to the NAND gate 34 is coupled to an inverter 36 which in turn receives the serial data from the shift register 14. Thus, when BADEN is at a logic low level, serial data is passed from the shift register 14 to the shift register 16, and when BADEN is at a high logic level during a byte adjust operation a low logic level or "zero" is supplied to the input of the shift register 16.

The ENSHFT2 signal generated by the control logic 24 is also supplied to an AND gate 38 along with the PH2 clock signal in order to generate a clock signal (CLK23) which is supplied to the shift registers 12 and 14. The control logic 24 also generates another enable shift signal (ENSHFT1) which is supplied along with PH2 to AND gate 40 in order to supply a clock signal CLK1 to the shift register 10. It will be readily appreciated, that the above described circuit arrangement permits the control logic 24 to independnetly enable shift register 10, shift registers 12 and 14, or shift register 16.

The operation of the DLC receiver will now be explained in greater detail. At the begining of data reception, the control logic 24 generates the ENSHFT1 signal in order to enable the operation of shift register 10. The serial data stream is supplied to the shift register 10 which parallel transfers each byte received to the control logic 24 as long as a flag or abort character is received. When the control logic 24 determines that a non-flag and non-abort character is received, it generates the ENSHFT2 signal to enable the operation of shift register 12-16 (note BADEN is low at this time). As the serial data is received, data from shift register 10 is serially shifted into shift register 12, the data in shift register 12 is shifted into shift register 14, and the data in shift register 14 is shifted in shift register 16. The shift register 16 does a parallel transfer to load each byte of received data into the FIFO.

Once the control logic 24 determines a non-flag and non-abort character has been received, it resets the bit counter 18 and the byte adjust counter 20 by generating an idle signal (IDEL). The bit counter 18 begins to count the number of received bits and when the count value of the bit counter 18 is equal to the number of bits in a byte, the bit counter 18 is internally resets to zero and begins counting the next byte. At the end of the packet of data being received, a closing flag will be shifted into the shift register 10. Once the control logic 24 determines a closing flag has been received, it sets ENSHFT2 low in order to disable the operation of shift registers 12-16. At this time, the closing flag would be in the shift register 10, two frame sequence check bytes would be in register 12 and 14, and the last bits of data received would be in the shift register 16.

As previously stated, the last bits received may not consititue a full byte if the character length of the communications protocol is less than the byte length. Thus, the bits remaining in shift register 16 consitutue residue bits which must be shifted over to the LSB of the shift register 16. For example, if the last data packet contained 5 bits, the three least significant bits of the shift register 16 would be not be filled (XXX11111).

When the closing flag is detected by the control logic 24, the control logic 24 generates the LBICO in order to load the value of the bit counter (0101) into the byte adjustment counter 20. The control logic 24 also generates the BYADJ signal to enable the operation of the byte adjust counter 24 and to drive BADEN high thereby enabling the operation of the shift register 16. The byte adjust counter 20 increments and the shift register 16 performs a shift operation on each clock cycle as long as the BADEN signal stay highs. When the byte adjust counter 20 counts to eight (the number of bits in a byte), however, the BADEN signal goes low disabling the operation of the shift register 16. It is noted that during this period, the input of the shift register 16 is being held at a low logic level by NAND gate 34 so that the shift register 16 loads "zeros" during the byte adjust operation. Thus, the residue bits contained in the shift register 16 are shifted over until the LSB of the shift register is filled and the three MSBs of the shift register 16 are filled with zeros (11111000).

It will be understood that the above description is of a preferred exemplary embodiment of the present invention, and the invention is not limited to the specific form shown. For example, the invention is applicable to other communication protocols, the number of bits in a byte can be defined as any given amount, and the particular architecture of the various components may vary. Additional, variations and modifications can be effected within the spirit and scope of the appended claims.

What is claimed:

1. An apparatus comprising a plurality of serially connected shift registers, said plurality of shift registers including at least one frame register, said at least one frame register having a serial input for receiving serial data and a serial output for transmitting serial data to an adjacent one of said plurality of shift registers, said plurality of shift registers further comprising a last byte register having a serial input for receiving data from a serial output of said at least one frame register, said apparatus further comprising means for enabling said shift registers to serially shift a received data stream, means for determining the number of residue bits contained in said last byte register when a closing frame is shifted into said at least one frame register and means for controlling a shifting operation of said last byte register until the least significant bit of said last byte register is filled with one of said residue bits.

2. The apparatus recited in claim 1, wherein said means for controlling the shifting operation of said last byte register serially shifts bits of a predetermined logical state into the most significant bit position of said last byte register until said least significant bit of said last byte register is filled with one of said residue bits.

3. The apparatus recited in claim 2, wherein the predetermined logical state is a logical zero.

4. The apparatus recited in claim 1, wherein the means for controlling the shifting operation of said last byte register enables operation of a byte adjust counter for controlling the number of shifts of residue bits in said last byte register.

5. The apparatus recited in claim 4, comprising a bit counter for maintaining a serial count of the number of bits in bytes in said received data stream, said bit counter being arranged to enable said byte adjust counter to shift residue bits in said last byte register and to be incremented until the count in said byte adjust counter indicates the number of bits in a byte.

6. A method of bit residue correction, the method comprising the steps of:

receiving bits of a serial data stream into one of a plurality of serially interconnected shift registers, the plurality having at least one frame register and a last byte register;

with a clock pulse, shifting said received bits from the most significant bit to the least significant bit of the shift registers;

determining the number of residue bits in said last byte register when a closing frame is shifted into said at least one frame register; and shifting said residue bits in said last byte register until the least significant bit of said last byte register is filled with one of said residue bits.

7. The method recited in claim 6, further comprising serially shifting bits of a predetermined state into the most significant bit of said last byte register until said least significant bit of said last byte register is filled with one of said residue bits.

8. The method recited in claim 6, further comprising the steps of maintaining in a bit counter a serial count of bits in each byte in said received data stream;

providing said serial count from said bit counter to a byte adjust counter at a time when said closing frame is detected;

and shifting said residue bits in said last byte register and incrementing said byte adjust counter until the count in said byte adjust counter equals the number of bits in a byte.

* * * * *